United States Patent
Kena et al.

(10) Patent No.: US 10,427,509 B2
(45) Date of Patent: Oct. 1, 2019

(54) ILLUMINATED BULB SEAL

(71) Applicant: FORD GLOBAL TECHNOLOGIES, LLC, Dearborn, MI (US)

(72) Inventors: Mukdam Kena, Sterling Heights, MI (US); Michael Murphy McElroy, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/835,505

(22) Filed: Dec. 8, 2017

(65) Prior Publication Data

US 2019/0176601 A1   Jun. 13, 2019

(51) Int. Cl.

| | | |
|---|---|---|
| *B60J 10/273* | (2016.01) | |
| *B60J 10/84* | (2016.01) | |
| *B60J 10/34* | (2016.01) | |
| *B60Q 3/62* | (2017.01) | |
| *B60Q 3/30* | (2017.01) | |
| *F21V 17/10* | (2006.01) | |
| *B60Q 3/50* | (2017.01) | |

(52) U.S. Cl.
CPC ............ *B60J 10/273* (2016.02); *B60J 10/34* (2016.02); *B60J 10/84* (2016.02); *B60Q 3/30* (2017.02); *B60Q 3/50* (2017.02); *B60Q 3/62* (2017.02); *F21V 17/101* (2013.01)

(58) Field of Classification Search
USPC .................................... 362/511; 428/99, 217
See application file for complete search history.

(56) References Cited

U.S. PATENT DOCUMENTS

| | | |
|---|---|---|
| 6,247,271 B1 | 6/2001 | Fioritto et al. |
| 7,226,112 B2 | 6/2007 | Ward |
| 7,533,841 B1* | 5/2009 | Harrison ............... B65H 75/14 |
| | | 242/388.5 |
| 8,850,748 B2 | 10/2014 | Zimmermann et al. |
| 9,472,931 B2 | 10/2016 | Maeda |
| 2005/0082813 A1 | 4/2005 | Seong |
| 2011/0050073 A1* | 3/2011 | Huang ..................... F21K 9/00 |
| | | 313/46 |
| 2013/0328354 A1 | 12/2013 | Bauer |
| 2014/0212621 A1* | 7/2014 | Blottiau ............... B29C 45/162 |
| | | 428/99 |

(Continued)

FOREIGN PATENT DOCUMENTS

| | | |
|---|---|---|
| DE | 202006003768 | 6/2006 |
| DE | 102005057991 | 6/2007 |
| FR | 2886238 | 12/2006 |

*Primary Examiner* — Allyson N Trail
(74) *Attorney, Agent, or Firm* — Carlson, Gaskey & Olds, P.C.

(57) ABSTRACT

A system according to an exemplary aspect of the present disclosure includes, among other things, a seal having a compressible bulb to provide sealing between a vehicle flange and a moveable panel, and a channel formed in an exterior surface of the bulb. A light source is positioned within the channel to extend along a length of the seal. A method according to an exemplary aspect of the present disclosure includes, among other things, forming a seal to have a compressible bulb that has a channel formed in an exterior surface of the bulb, and installing a light cable within the channel to extend along a length of the seal.

23 Claims, 4 Drawing Sheets

(56) References Cited

U.S. PATENT DOCUMENTS

| | | | |
|---|---|---|---|
| 2015/0246637 A1* | 9/2015 | Salter | H05B 37/0218 362/510 |
| 2016/0250912 A1* | 9/2016 | Borges Filho et al. | B60J 10/25 296/154 |
| 2017/0036590 A1* | 2/2017 | Stegemann | B60Q 1/323 |
| 2017/0113393 A1* | 4/2017 | Krueger | B60J 10/78 |

* cited by examiner

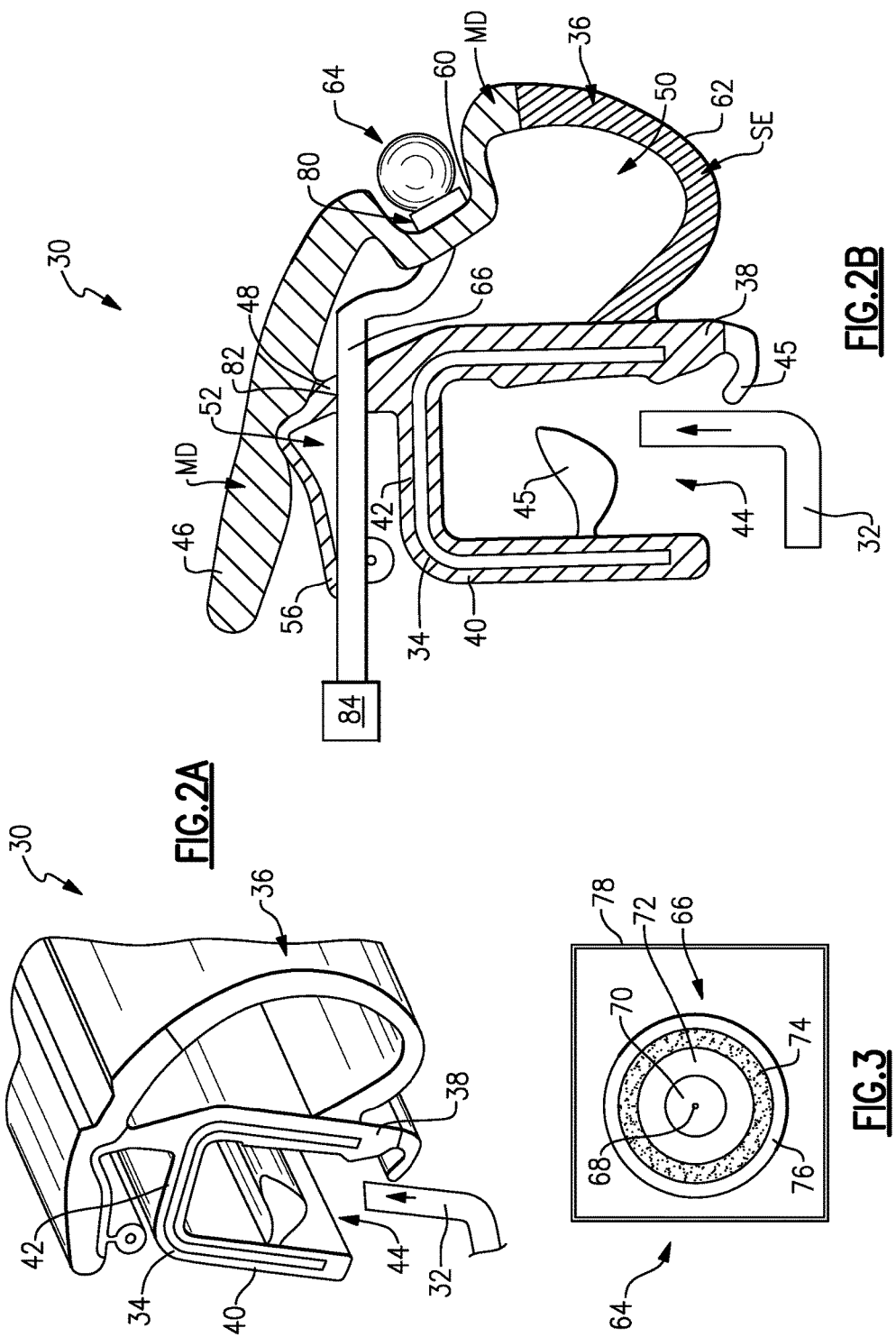

ILLUMINATED BULB SEAL

TECHNICAL FIELD

This disclosure relates to a method and system to provide an illuminated bulb seal that improves lighting conditions around vehicle closure panel openings.

BACKGROUND

Vehicles include various openings that are accessible from outside the vehicle such as door openings, lift-gate openings, and hatchback openings, for example. Vehicles also include various compartments that are accessible from outside the vehicle such as an engine compartment or trunk, for example. Under low light conditions such as early in the morning or at night, it is more difficult to see clearly into such compartments and/or openings.

SUMMARY

A system according to an exemplary aspect of the present disclosure includes, among other things, a seal having a compressible bulb to provide sealing between a vehicle flange and a moveable panel, and a channel formed in an exterior surface of the bulb. A light source is positioned within the channel to extend along a length of the seal.

In a further non-limiting embodiment of the foregoing system, the channel extends along an entire length of the seal and wherein the light source extends along an entire length of the channel.

In a further non-limiting embodiment of either of the foregoing systems, at least a portion of the light source is exposed and visible when installed in the channel.

In a further non-limiting embodiment of any of the foregoing systems, the light source comprises at least one fiber optic cable or a flexible light pipe.

In a further non-limiting embodiment of any of the foregoing systems, the system includes an adhesive member to seat and hold the light source within the channel.

In a further non-limiting embodiment of any of the foregoing systems, the seal includes a rigid substrate configured to mount the bulb to the vehicle flange.

In a further non-limiting embodiment of any of the foregoing systems, the seal includes a lip defining a scuff plate cavity and configured to extend over a scuff plate associated with the vehicle flange.

In a further non-limiting embodiment of any of the foregoing systems, the seal includes at least one opening in a seal wall extending between the lip and the rigid substrate to route the light source to a light emitter.

In a further non-limiting embodiment of any of the foregoing systems, the bulb defines a cavity between the substrate and an inner surface of the bulb, and wherein the light source is seated in the channel external of the cavity.

Another exemplary system according to an exemplary aspect of the present disclosure includes, among other things, a vehicle flange, a panel moveable relative to the flange between an open and closed position, and a seal having a rigid substrate attached to the flange and a compressible bulb to engage the panel. A channel is formed in an exterior surface of the bulb and a light source is positioned within the channel to extend along a length of the seal.

In a further non-limiting embodiment of any of the foregoing systems, the channel extends along an entire length of the seal and wherein the light source extends along an entire length of the channel.

In a further non-limiting embodiment of any of the foregoing systems the bulb defines a cavity between the substrate and an inner surface of the bulb, and wherein the light source is seated in the channel external of the cavity and wherein the channel is formed from a higher density material than a remaining portion of the bulb.

In a further non-limiting embodiment of any of the foregoing systems, the seal includes a lip defining a cavity and extending over a scuff plate associated with the flange, and a wall that connects the lip to the substrate, and including at least one opening in the wall to route the light source from the light source to a light emitter.

In a further non-limiting embodiment of any of the foregoing systems the panel comprises at least one of a vehicle door, lift-gate, trunk, hood, and hatchback.

A method according to another exemplary aspect of the present disclosure includes, among other things: forming a seal to have a compressible bulb that has a channel formed in an exterior surface of the bulb; and installing a light cable within the channel to extend along a length of the seal.

In a further non-limiting embodiment of the foregoing method, the method includes bending back at least one lip of the channel and manually inserting the light cable into the channel.

In a further non-limiting embodiment of either of the foregoing methods, the method includes extruding the seal, bending back at least one lip of the channel as the seal exits an extruder, and automatically inserting the light cable into the channel via a spool.

In a further non-limiting embodiment of any of the foregoing methods, the method includes leaving at least a portion of the light cable exposed and visible after installing the light cable in the channel.

In a further non-limiting embodiment of any of the foregoing methods, the method includes forming the seal to have a rigid substrate configured to mount the bulb to a vehicle flange such that the bulb defines a cavity between the substrate and an inner surface of the bulb, and including seating the light cable into the channel external of the cavity.

In a further non-limiting embodiment of any of the foregoing methods. The method includes installing an adhesive member within the channel to seat and hold the light cable within the channel.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2A is a perspective section view of a seal for the door and trunk openings as shown in FIGS. 1A and 1B.

FIG. 2B is a section view of the seal of FIG. 2A with a light source installed in the seal.

FIG. 3 is a section view of the light source of FIG. 2B.

DETAILED DESCRIPTION

This disclosure details exemplary methods and systems that provide an illuminated bulb seal that improves lighting conditions around vehicle closure panel openings. These and other features are discussed in greater detail in the following paragraphs of this detailed description.

Figure 1A:
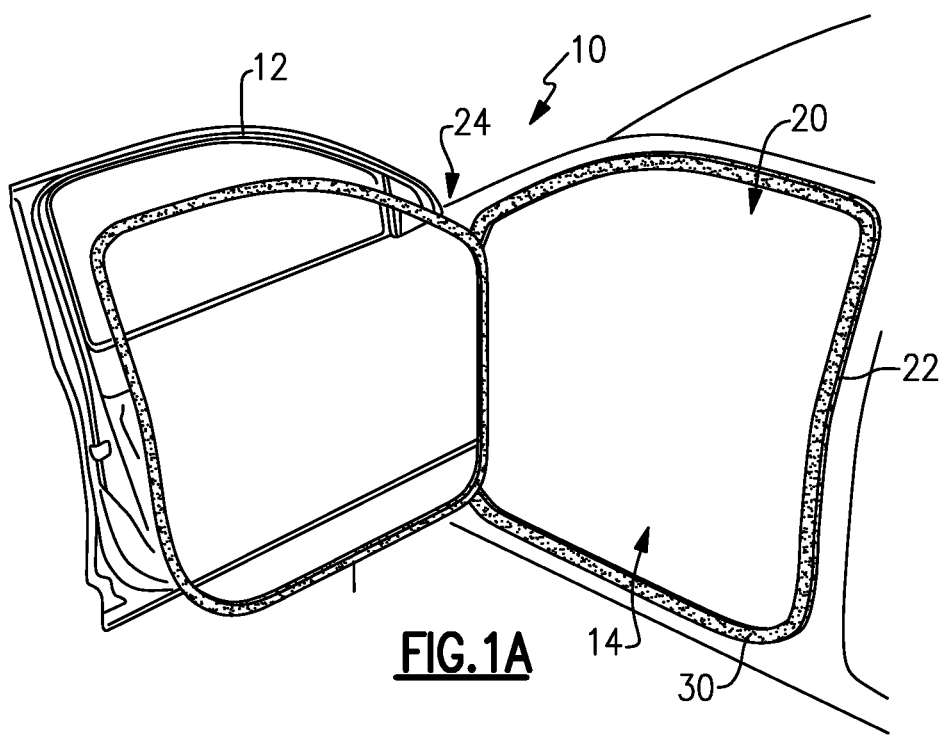
FIG. 1A is a perspective view of a vehicle door with a seal incorporating the subject invention.
Figure 1B:
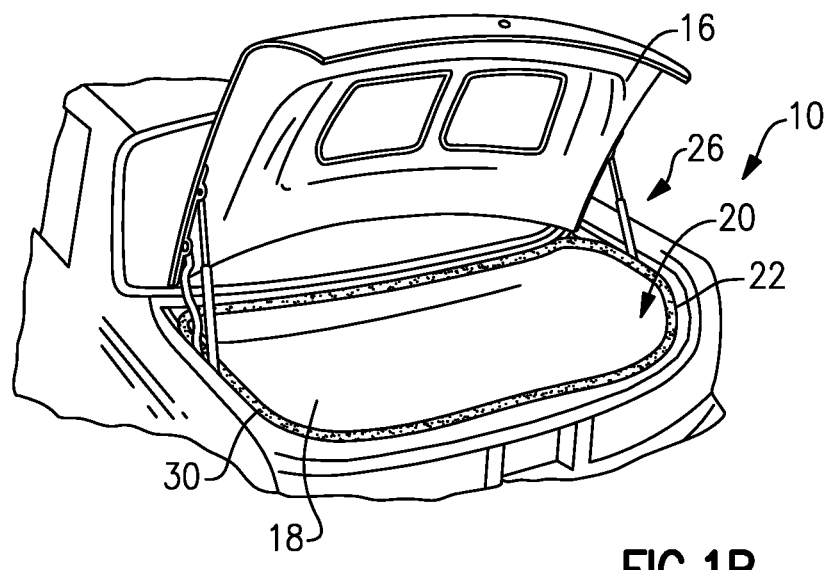
FIG. 1B is a perspective view of a vehicle trunk with a seal incorporating the subject invention.

FIG. 1A schematically illustrates a vehicle 10 that includes a closure panel, such as a door 12 for example, which is moveable between an open position to provide access to a passenger area 14 and a closed position to enclose the passenger area 14. FIG. 1B schematically illustrates a closure panel, such as a trunk lid 16, for example, which is moveable between an open position to provide access to a cargo area 18 and a closed position to cover the cargo area 18. FIGS. 1A and 1B both show the closure panels, e.g. door 12 and trunk lid 16, in the closed positions.

Each closure panel covers an opening 20 that is surrounded by a perimeter 22. The door 12 has pivot attachment interface 24 at one edge to allow the door 12 to move between the open and closed positions. The trunk lid 16 also includes a pivot attachment interface 26 at one edge to allow the trunk lid 16 to move between the open and closed positions. An illuminated seal 30 is installed about the perimeter 22 to provide illumination when the closure panel is opened to enhance visibility. This added illumination is especially beneficial under low light conditions such as early in the morning or at night.

One example of the illuminated seal 30 is shown in FIGS. 2A-2B. The openings 20 for the closure panels are surrounded by a fixed vehicle structure such as a mount flange 32 (FIG. 4), for example. The seal 30 is seated on this flange 32 about the perimeter 22 of the opening 20. In the example of FIGS. 2A-B, the seal 30 includes a rigid substrate 34 that is configured to mount the seal to the flange 32 and a compressible bulb 36 that extends outwardly of the substrate 34 to provide sealing between the flange 32 and closure panel when the door 12 or trunk lid 16 is in the closed position.

The rigid substrate 34 includes a first leg 38, a second leg 40 generally parallel to and spaced apart from the first leg 38, and a connecting portion 42 that connects one end of the first leg 38 to an end of the second leg 40 to form a U-shape. The opposite ends of the first 38 and second 40 legs are free from contact with each other such that an open cavity 44 is formed between the legs 38, 40. The flange 32 is inserted into this cavity 44 to seat the seal 30 about the opening 20. One or more fingers 45 can extend inwardly from either of the legs 38, 40 to facilitate securely mounting and holding the flange 32 within the cavity 44.

The bulb 36 extends outwardly from the first leg 38 and transitions to a lip 46 that is connected to the substrate 34 by a wall 48. A bulb cavity 50 is enclosed by the wall 48, lip 46, first leg 38 and an inner surface of the bulb 36. The cavity 50 collapses when the bulb 36 is compressed between the flange 32 and the associated closure panel to provide a sealed interface.

A scuff plate cavity 52 is formed between the lip 46 and the connecting portion 42 of the substrate 34. The cavity 52 receives a scuff plate 54 (FIG. 4) that covers the flange 32. An additional inner lip 56 can extend inwardly from the upper lip 46 to facilitate receipt of the scuff plate 54 in the scuff plate cavity 52.

As shown in FIG. 2B, a channel 60 is formed in an exterior surface 62 of the bulb 36. A light member or light source 64 is positioned within the channel 60 to extend along a length of the seal 30. The light member 64 provides a source of illumination that extends about the perimeter 22 of the opening 20. In one example, the channel 60 extends along an entire length of the seal 30 such that the light source 64 extends along an entire length of the channel 60 and seal 30. In the examples shown in FIGS. 1A and 1B, seals 30 extend completely about the openings 20; however the seal 30 could also be configured to extend only around designated portions of a closure panel opening as needed to provide a source of illumination.

As the light source 64 is mounted within the external surface 62 of the bulb 36, at least a portion of the light source 64 is exposed and visible when installed in the channel 60. The channel 60 thus forms an inwardly extending portion that extends into the cavity 50, but which provides an externally facing mount surface for the light source 64. As such, the light source 64 is positioned externally of the bulb cavity 50 to provide better illumination.

In one example, the light source 64 comprises a flexible light pipe or flexible fiber optic cable 66 (FIG. 3) that is durable enough to withstand any compressive force that may be applied as the bulb 36 deforms. In one example, the flexible light pipe or fiber optic cable 66 includes a light source core 68 surrounded by cladding 70, a coating 72 that is applied to the cladding 70, a layer of strengthening fibers 74 that surround the coating 72, and an outer jacket 76. The light source core can comprise laser or laser emitting diode (LED) lights, for example. The coating 72 can be used to increase material strength of the cable 66 to provide additional support if required for the specific application. In one example, the layer of strengthening fibers 74 comprises Kevlar® or other similar high strength fibers that are resistant to crush loads. The outer jacket 76 can be translucent or excluded to allow for more or less illumination as deemed necessary. Optionally, the cable 66 can be installed within an additional cover or sleeve 78 to further facilitate mounting of the cable 66 in the channel 60. The sleeve 78 could also be translucent.

In one example, an adhesive 80 is used to securely seat, mount, and hold cable 66 in the channel 60. In one example, the adhesive 80 comprises a strip of double sided tape that is laid within the channel 60 or which is attached to the cable 66 prior to being inserted into the channel 60. In one example, a heat laminated tape is used as this type of material increases the stiffness of the bulb 36 to securely hold the light source 64 in place. In one example, the sleeve 78 comprises a polygonal shaped cross-section that receives the circular cross-section cable 66. This type of configuration has a flat surface on the sleeve 78 that provides increased surface area for mating with the adhesive 80 as compared to the surface area that would be available with the circular cable 66 alone.

In one example, at least one opening 82 is provided in the seal wall 48 that extends between the lip 46 and the rigid substrate 34. The pipe body or cable 66 of the light source 64 is routed through this opening 82 to connect the light source 64 to a light emitter 84 (FIG. 2B). In one example, the light emitter 84 comprises a light, e.g. a light bulb, mounted in the interior that emits or pipes light through the light source 64 via the pipe or cable 66.

Figure 4:
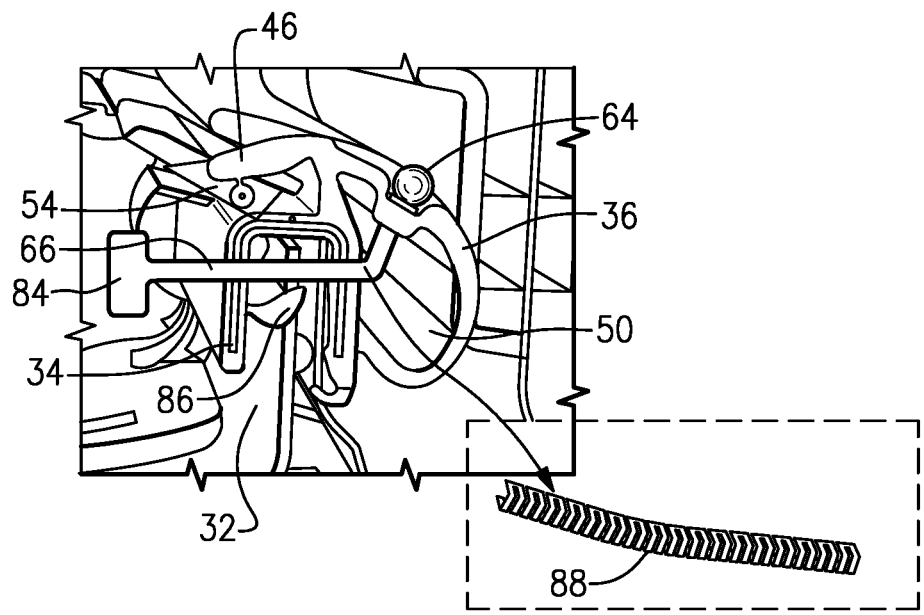
FIG. 4 shows a section view of a seal mounted on a mount flange where the light source is routed through the flange and to a light emitter.

In another example shown in FIG. 4, the light source 64 is routed through the mount flange 32. One or more openings 86 would need to be cut into the flange 32 to route the light source 64. Corresponding openings would need to be formed within the legs 38, 40 of the substrate 34 to route the light source 64. An optional spiral plastic carrier 88 could be used to protect the light source 64. In one example, the seal 30 is extruded as a single piece that includes both the rigid substrate 34 and bulb 36 that is made from a material that is more compressible/softer than the rigid substrate 34. In one example, the bulb 36 is comprised of a sponge elastomer, e.g. EPDM, and the rigid substrate 34 is comprised of a more rigid elastomer, e.g. micro dense EPDM. A channel 60 is formed in the external surface 62 of the bulb 36 to provide a pocket 90 (FIG. 5) to receive the cable 66 and lip portions 92 to facilitate holding the cable 66 in the pocket 90. Heat laminated tape 80 is additionally used to securely fix the cable 66 to the bulb 36. The seal 30 can still be compressed with minimal impact to performance while ensuring the cable 66 is located such that it will not be damaged. The channel 60 can be open to the exterior, as indicated at 94, such that light can be emitted all the way around the opening 20. Multiple cables 66 can be installed in the seal 30 to provide brighter point lighting where needed. The fiber optic cladding can have a refractive index such that it emits more or less light as required by different applications. The cables 66 can be installed manually or automatically as the seal 30 is extruded.

As shown in FIG. 2B, the channel portion 60 and the lip portion 46 of the seal 30 is formed from the more rigid material as indicated at MD, while the remaining portion of the bulb 36 from an outer edge of the channel 50 to the leg 38 is formed from the sponge elastomer as indicated at SE.

Figure 5:
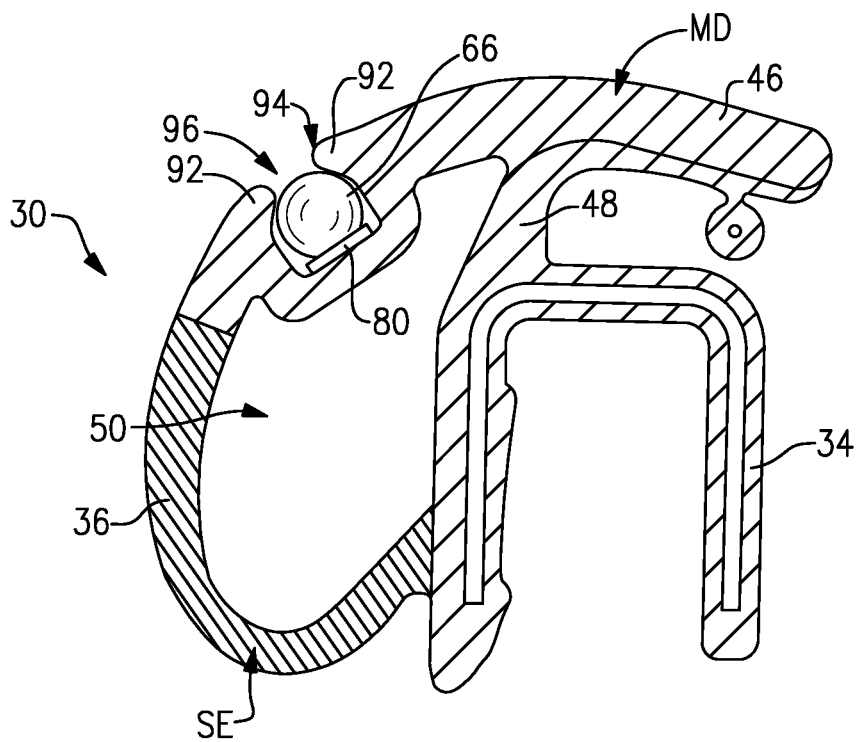
FIG. 5 shows one example method of assembly.

FIG. 5 shows one example of a manual assembly method. One lip portion 92 can be manually peeled or bent outwardly, as indicated at 96, to start insertion of the cable 66. This method can be followed for the entire length of the seal 30 with the lip portion 92 being manually bent back as the cable 66 is inserted into the channel 60.

Figure 6B:
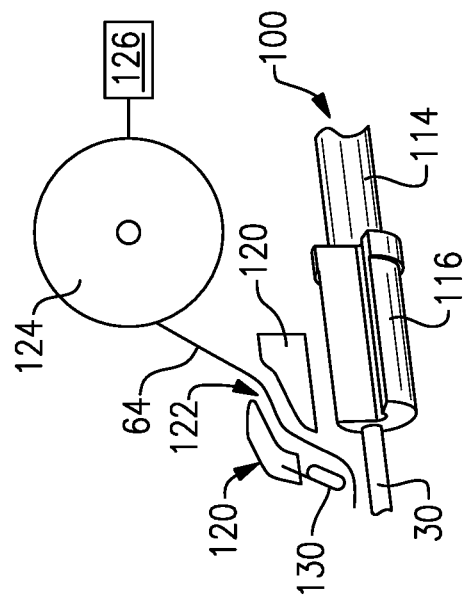
FIG. 6B shows another example method of assembly that is done automatically as the seal exits the extruder of FIG. 6A.
Figure 6A:
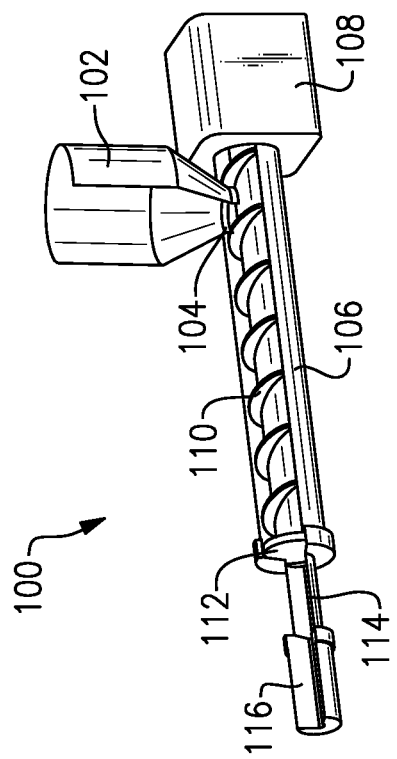
FIG. 6A shows an example of an extruder used to make the seal.

FIG. 6A shows an example of an extruder 100 that is used to form the seal 30. The extruder 100 operates in a known manner and includes a hopper 102 that feeds material through a throat 104 and into a barrel 106. A motor 108 drives a screw 110 in the barrel 106 that is coupled to a breaker plate 112. Material exits the barrel 106 via a feed pipe 114 that feeds material into a die 116.

As shown in FIG. 6B, the seal 30 is extruded and exits the die 116. The seal 30 is extruded as a integrally formed and single piece component such that the channel portion 60 and the lip 46 portions of the seal 30 are formed from the more rigid material MD, while the remaining portion of the bulb 36 from an outer edge of the channel 50 to the leg 38 is formed from the sponge elastomer SE. A cushion or guide 120 is supported relative to the die 116 and includes a feed opening 122 for the cable 66. The light source 64 can be supported on a spool drive 124 that has a rotation/feed rate that is automatically controlled by a controller 126 in relation to the extrusion rate of the seal 30 exiting the die 116. The die 116 can include a wedge or similar mechanism to automatically peel or bend back the lip portion 92 as the seal 30 exits the extruder 100. A controlled finger or guide member 130, which extends from the guide 120, can then be used to automatically insert the light source 64 into the channel 60 via the spool drive 124. The heat laminated tape 80 can also be automatically inserted using this process.

The subject invention provides a lighting system for vehicle closure panels such as doors, trunks, lift-gates, hatchbacks, etc. that improves visibility under low light conditions such as in the early morning or at night. A flexible light pipe or fiber optic light is included into a sealing member that surrounds the opening. A channel is formed within a bulb portion of the seal such that the light member can easily be installed within the channel. The assembly of the cable into the seal can be done manually or automatically in any of the various methods described above. The subject invention eliminates the need to add interior lighting into other trim components and directly illuminates the door or trunk opening. This reduces the amount of wiring and light sources that are required within the vehicle, which also reduces weight and cost.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system, comprising:
   a seal having a compressible bulb to provide sealing between a vehicle flange and a moveable panel;
   a channel formed in an exterior surface of the bulb; and
   a light source positioned within the channel to extend along a length of the seal.

2. The system according to claim 1 wherein the channel extends along an entire length of the seal and wherein the light source extends along an entire length of the channel.

3. The system according to claim 1 wherein at least a portion of the light source is exposed and visible when installed in the channel.

4. The system according to claim 1 wherein the light source comprises at least one fiber optic cable or flexible light pipe.

5. The system according to claim 1 including an adhesive source to seat and hold the light source within the channel.

6. The system according to claim 1 wherein the seal includes a rigid substrate configured to mount the bulb to the vehicle flange.

7. The system according to claim 6 wherein the seal includes a lip defining a scuff plate cavity and configured to extend over a scuff plate associated with the vehicle flange.

8. The system according to claim 7 including at least one opening in a seal wall extending between the lip and the rigid substrate to route the light source to a light emitter.

9. The system according to claim 6 wherein the bulb defines a cavity between the substrate and an inner surface of the bulb, and wherein the light source is seated in the channel external of the cavity.

10. A system, comprising:
    a vehicle flange;

a panel moveable relative to the flange between an open and closed position;

a seal having a rigid substrate attached to the flange and a compressible bulb to engage the panel;

a channel formed in an exterior surface of the bulb; and a light source positioned within the channel to extend along a length of the seal.

11. The system according to claim 10 wherein the channel extends along an entire length of the seal and wherein the light source extends along an entire length of the channel.

12. The system according to claim 10 wherein the bulb defines a cavity between the substrate and an inner surface of the bulb, and wherein the light source is seated in the channel external of the cavity, and wherein the channel is formed from a higher density material than a remaining portion of the bulb.

13. The system according to claim 10 wherein the seal includes a lip defining a cavity and extending over a scuff plate associated with the flange, and a wall that connects the lip to the substrate, and including at least one opening in the wall to route the light source to a light emitter.

14. The system according to claim 10 wherein the panel comprises at least one of a vehicle door, lift-gate, trunk, hood, and hatchback.

15. A method, comprising:

forming a seal to have a compressible bulb that has a channel formed in an exterior surface of the bulb; and installing a light cable within the channel to extend along a length of the seal.

16. The method according to claim 15 including bending back at least one lip of the channel and manually inserting the light cable into the channel.

17. The method according to claim 15 including extruding the seal, bending back at least one lip of the channel as the seal exits an extruder, and automatically inserting the light cable into the channel via a spool.

18. The method according to claim 15 including leaving at least a portion of the light cable exposed and visible after installing the light cable in the channel.

19. The method according to claim 15 including forming the seal to have a rigid substrate configured to mount the bulb to a vehicle flange such that the bulb defines a cavity between the substrate and an inner surface of the bulb, and including seating the light cable into the channel external of the cavity.

20. The method according to claim 15 including installing an adhesive member within the channel to seat and hold the light cable within the channel.

21. The method according to claim 15 including forming the seal to have a rigid mount portion, and wherein the compressible bulb provides an enclosed cavity that collapses when the bulb is compressed between the rigid mount portion and an associated closure panel to provide a sealed interface, and forming the channel from a higher density material than a remaining portion of the bulb.

22. The system according to claim 10 wherein the compressible bulb provides an enclosed cavity that collapses when the bulb is compressed between the flange and the panel, and wherein the channel comprises an inwardly extending portion that indents toward the cavity and provides the exterior surface to mount the light source.

23. The system according to claim 1 wherein the compressible bulb provides an enclosed cavity that collapses when the bulb is compressed between the flange and the panel, and wherein the channel comprises an inwardly extending portion that indents toward the cavity and provides the exterior surface to mount the light source.

* * * * *